US009372534B2

(12) United States Patent
Santos Paiva Ferraz da Conceicao

(10) Patent No.: US 9,372,534 B2
(45) Date of Patent: Jun. 21, 2016

(54) INTERACTIVE WEARABLE VIDEOGAME THROUGH THE USE OF WIRELESS ELECTRONIC SENSORS AND PHYSICAL OBJECTS

(76) Inventor: Marta Isabel Santos Paiva Ferraz da Conceicao, Aroeira (PT)

( * ) Notice: Subject to any disclaimer, the term of this patent is extended or adjusted under 35 U.S.C. 154(b) by 0 days.

(21) Appl. No.: 13/978,238

(22) PCT Filed: Jan. 4, 2012

(86) PCT No.: PCT/PT2012/000002
§ 371 (c)(1),
(2), (4) Date: Jul. 3, 2013

(87) PCT Pub. No.: WO2012/093950
PCT Pub. Date: Jul. 12, 2012

(65) Prior Publication Data
US 2013/0288761 A1    Oct. 31, 2013

(30) Foreign Application Priority Data
Jan. 4, 2011    (PT) .......................................... 105469

(51) Int. Cl.
*G06F 3/01* (2006.01)
*A63F 13/211* (2014.01)
(Continued)

(52) U.S. Cl.
CPC ................ *G06F 3/015* (2013.01); *A63F 13/00* (2013.01); *A63F 13/211* (2014.09);
(Continued)

(58) Field of Classification Search
CPC ......... A63F 13/65; A63F 13/80; A63F 13/92; A63F 13/211; A63F 13/5255; A63F 13/217; A63F 13/218; A63F 2300/105; A63F 2300/204; A63F 2300/6676; A63F 2300/69; A63F 2300/8082; G06F 3/011; G06F 3/015

USPC ...................................... 463/7, 30–31, 36–37
See application file for complete search history.

(56) References Cited

U.S. PATENT DOCUMENTS 5,143,505 A * 9/1992 Burdea et al. ..................... 414/5
5,565,840 A * 10/1996 Thorner et al. ............ 340/407.1
(Continued)

FOREIGN PATENT DOCUMENTS

EP        1 956 600 A1    8/2008

OTHER PUBLICATIONS

International Search Report and Written Opinion for International Application No. PCT/PT2012/000002, mailed Oct. 8, 2012.
(Continued)

*Primary Examiner* — Pierre E Elisca
*Assistant Examiner* — David Duffy
(74) *Attorney, Agent, or Firm* — Lucas & Mercanti, LLP

(57) ABSTRACT

The invention is an interactive wearable video game (1), in which one or more players interact with physical objects through physical actions/contact/physiological signals to control a video game. The apparatus includes a series of wireless electronic sensors (7 to 16) to be placed in the user's body/surrounding environment, detecting the user's input actions in real time—output result is visualized on a binocular see-through display glasses system (2). The invention allows for the players to move around by connecting with the physical space, and to use their full bodies to control the game, exercise and share interactions. It allows for the connection between both virtual and physical realities—mixed reality concept by augmenting the user's perceptions among the surrounding environment. Users can either communicate from maximum physical proximity through a Web connection. The invention is rechargeable by converting produced solar energy into electric energy.

21 Claims, 4 Drawing Sheets

(51) Int. Cl.
*A63F 13/217* (2014.01)
*A63F 13/218* (2014.01)
*A63F 13/00* (2014.01)

(52) U.S. Cl.
CPC ............ *A63F 13/217* (2014.09); *A63F 13/218* (2014.09); *G06F 3/011* (2013.01); *A63F 2300/105* (2013.01); *A63F 2300/204* (2013.01); *A63F 2300/6676* (2013.01); *A63F 2300/69* (2013.01); *A63F 2300/8082* (2013.01)

(56) References Cited

U.S. PATENT DOCUMENTS 7,967,679 B2 * 6/2011 Ombrellaro et al. ............ 463/30
2004/0229702 A1 * 11/2004 Cooke .............................. 463/47
2005/0113167 A1 * 5/2005 Buchner et al. ................. 463/30
2005/0250582 A1 * 11/2005 Lopez ............................ 463/47
2007/0207858 A1 9/2007 Breving
2008/0081692 A1 4/2008 Pope et al.

OTHER PUBLICATIONS

International Preliminary Report on Patentability for International Application No. PCT/PT2012/000002, mailed Jul. 18, 2013.
Cheok et al., Human Pacman: A Mobile Entertainment System with Ubiquitous Computing and Tangible Interaction over a Wide Outdoor Area. Mobile HCI 2003. Sep. 11, 2003. pp. 209-224.

* cited by examiner

INTERACTIVE WEARABLE VIDEOGAME THROUGH THE USE OF WIRELESS ELECTRONIC SENSORS AND PHYSICAL OBJECTS

CROSS-REFERENCE TO RELATED APPLICATIONS

The subject application is a U.S. National Stage application of International Application No. PCT/PT2012/000002, filed on 4 Jan. 2012, which claims the priority of Portugal Patent Application No. 105469, filed on 4 Jan. 2011. The contents of which are herein incorporated by reference in its entirety.

FIELD OF THE INVENTION

The present invention relates to a wearable video game that requires one or more players, can be played solely or collectively. The interactive video game is wearable and contains many wireless electronic sensors that allow that the user connects with the environment in real time, with others users, building its own game or plays the pre-established video game narrative.

The invention is rechargeable by converting produced solar energy into electric energy.

PRIOR ART

The art of video games is very comprehensive and full of interactive solutions, most of which is used in physical closed environments.

However, the current interactive video game is limited to a certain physical space, as well as other electronic devices, including a television.

The present invention allows that the interactive game is played in various physical environments, whether outdoors or indoors.

SUMMARY OF THE INVENTION

The present invention relates to a wearable video game apparatus with real-time input from the user's body physical actions and physiological signals to obtain a real-time output from the game avatar/virtual scenarios at the same time the user connects with different physical environments—different contexts, other users/persons and physical objects by displacement and manipulations.

The connection from the users with the apparatus invention is made through the use of wireless electronic sensors attached to the wearable video game, or to physical objects in different contexts, other users/persons, and even various physical objects.

The designed video game software that connects with the hardware from the wearable video game apparatus is run by a portable multi-touch video game console system in the user's body.

This apparatus invention is then to be used in mixed reality environments, virtual and physical spatial contexts (indoors and outdoors), allowing also for different geographical connections in a virtual/physical collaborative platform between various wearable video game apparatus.

The interactive wearable video game provide a symbiosis real time connection from both real and virtual realities—most of the developed scenarios aim to combine a symbolic intention from the virtual scenario, to be applied in the real physical environment where the user plays the pre-established video game narrative. User can also program its video game narrative by building its own game—constructs its own game.

The interactive wearable video game is to be played not only by a single player but also by multiple players' since the users can interact collaboratively with the system—at the same time communicating simultaneously with the apparatus through the wireless electronic sensors/physical objects in different spatial contexts and by playing various games in the video game software.

The system apparatus enhances the playable area of video games, since it allows the game to be played indoors or outdoors, even online, provided that there is an online connection between players all over different geographical areas—same or different spatial physical areas.

The invention persuades the user to connect collaboratively with maximum physical proximity with other players in the same spatial field through the use of an wireless electronic sensor that detects user's proximity.

The electronic wireless sensors with physical objects can be attached to the interactive wearable video game with a fastener system, an example of which may include but is not limited to Velcro®, (Velcro is a registered trademark of the Velcro Corporation in the United States, other countries or both) in different locations and according to the pretend user's choices to perform different motor input actions.

Now, each user can build a different physical and virtual character with different virtues. These wireless electronic sensors are connected to an I/O board by a wireless communications protocol, an example of which may include but is not limited to Bluetooth®, (Bluetooth is a registered trademark of Bluetooth SIG Corporation in the United States, other countries or both), which it's placed in a multi-touch video game portable console system. This I/O board wirelessly captures and translates the wireless electronic sensors input signals with high resolution into digitally computer-encoded messages to the micro multi-touch computer system placed in a front pocket/user's wrist of the wearable video game system apparatus.

All the input data from the electronic sensors is transmitted to a software video game program inside the multi-touch video game portable console system—the data is then processed by the software and converted into triggers that make the videogame react. The final result of the software process is then transmitted from the micro multi-touch video game portable console system wirelessly to a binocular see-through visualization glasses system device that its placed in the users head (head circumference of the eyes) and that allows for the video game image to be visualized—through both eyes, or left, or right eye according to the user's preference controlled by the user in the video game software.

The Wireless electronic sensors data acquisition is provided to input into the video game software scenarios the user's real-time: body displacement on a spatial context (directions in three dimensions—height, width, length), manipulations (full body different types of motor actions); physical objects contact/users/persons and users/persons physical proximity; heart rate data (measuring user's heart rate variability—persuading for personalized healthy levels of physical exercise rates, emotional states control); skin galvanic response data (measuring user's emotional states translated into the video game tasks goals); brain electric activity data (measuring user's electric brain activity translated into the video game tasks goals).

The user's motor actions input persuaded by the game tasks corresponds to common physical gestures—walking, running, jumping, rotating, trotting, sliding, pressing, pushing, pulling, catapulting, catching, throwing, among all the possible user's bodies motor actions. The connection to the physical environments is achieved by persuasive action, and this can be done in two ways: the user is motivated to interact with the physical environment and this action is captured by the wireless electronic sensors on the apparatus; the user is motivated to interact with the physical environment by triggering the wireless electronic sensors external to the apparatus and remotely transferred to the software program. This means that this kind of action can either work in an independent mode (using only the apparatus) or it can happen in a pre-prepared environment where the game is enhanced.

The collaborative actions are performed during the proposed software video game tasks over specific extend periods of time: users can share the video game by playing with the same wearable video game system apparatus and its components (e.g. multiple users pressing physical objects—inflated toys—connected to the wireless electronic sensors apparatus); collaborate by being persuaded through the software video game multiple tasks to gain physical proximity between different wearable video game system apparatus—measured by a proximity electronic sensor; collaborate by playing and sharing multiple software video game tasks in the same geographical spatial area with different wearable suit video game system apparatus (through GPS and WEB server); collaborate online through GPS/Web server in different geographical spatial areas using different wearable video game system apparatus.

The user can also control the wireless electronic sensors data values input intensity through the video game software—changing the main characteristics of its role-play according with the pretended video game actions input by establishing the pretend wireless electronic sensors input intensity. The user can also record its game narratives by using a video camera placed in the binocular see-through visualization glasses system and shared them on-line. Creating a new type of body-to-body communication can develop the user's social-affective competences.

Moreover, through the use of this wearable video game apparatus users are persuaded to develop their cognitive, motor and social-affective competences by playing and creating their own video games narratives in mixed reality environments—physical and virtual.

Also the persuaded physical activity goal its intended to achieve high physical activity levels exploring various forms of movement possibilities and increasing energy expenditure rates—which can result on preventing overweight and obesity pathologies, by promoting user's physical health.

The interactive wearable video game apparatus can be used, namely, in home, playgrounds, schools, rehabilitation.

The extend collective connection characteristic from the interactive wearable video game apparatus with data collection tool for online sharing data results (body displacement on a spatial context, manipulations, physical objects contact and users/persons physical proximity, heart beat data, galvanic skin response data, and brain electric activity data), game competitions, new game constructions (collaborative games using body displacement on a spatial context, manipulations, physical objects contact and users/persons physical proximity, heart beat data, skin galvanic response data, and brain electric activity data), created role-play narratives videos, besides scientific data acquisition, gives to the invention the characteristics of being a worldwide contextual and embodied connection apparatus.

The wearable video game apparatus energy demands of the system are self-sustaining: solar energy (solar battery) is captured and converted into electric energy to power all the components of the system apparatus.

An advantage of the invention is persuades the user to increase its physical activity levels and learning skills—produced motor and physiological data combined results on an accurate measurement of the real-time state of the user's body displacement on a spatial context, manipulations, physical objects contact and users/persons physical proximity, heart beat data, skin galvanic response data (emotional states), and brain electric activity data—and from this the system will adapt the software response to motivate the user to undertake a course in the narrative to better suit its physical, physiological and psychological needs.

Furthermore, the users are persuaded to execute and learn different motor actions with their full bodies, and to understand and control their physiological data signals at the same time they are persuaded to learn about different theoretical fields (e.g. math, biology, chemistry, physics, anatomy, astronomy, science, ecology, among others). The wearable video game system apparatus its attached with different electronic physical components—plurality of detachable wireless sensors that can be connected to all kind of physical objects (e.g. inflatable toys, balls, action figures, skates, among others).

DETAILED DESCRIPTION OF THE INVENTION

Figure 1:
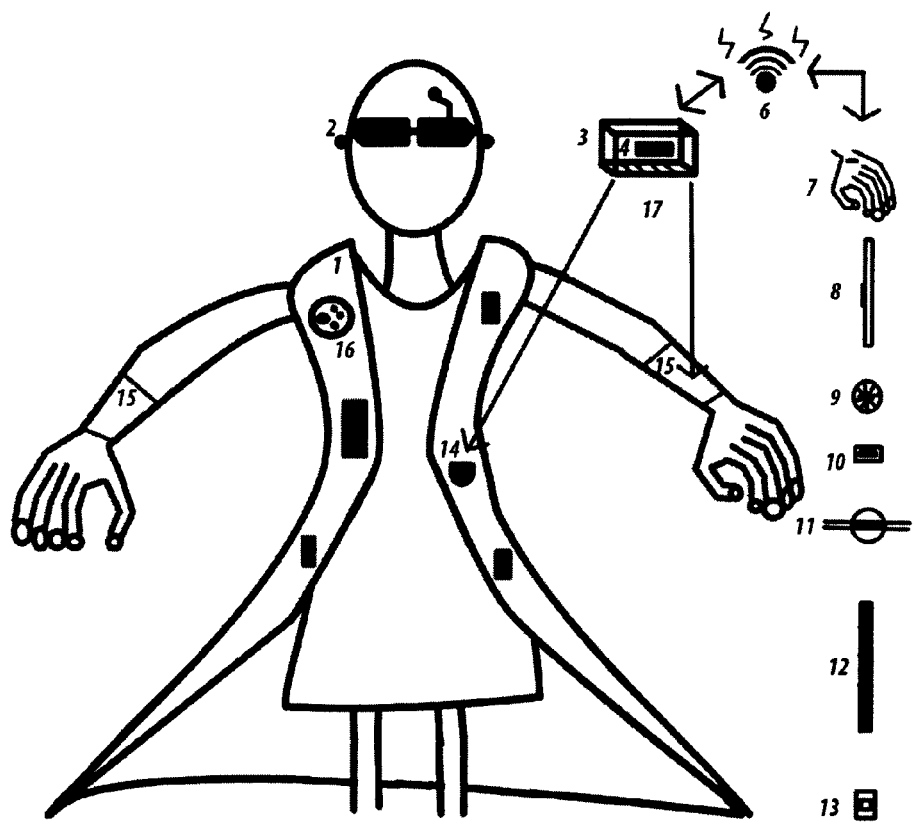
FIG. 1 is a draw of the front of the wearable video game system apparatus invention with the representative wireless electronic sensors, the multi-touch video game portable console system, the Bluetooth® wireless connection, the wireless binocular see-through display glasses system and the Velcro® system.
Figure 2:
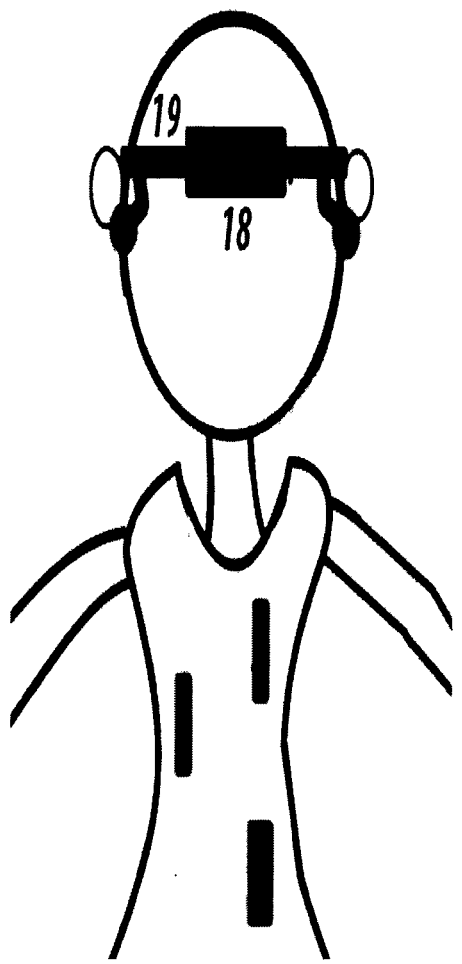
FIG. 2 is a draw of the back the wearable video game system apparatus invention with the representative wireless electrical brain activity Bluetooth® box transmitter and the wireless brain electrical activity sensor pads connected to the binocular see-through display glasses rubber strap. Units of the Velcro® system are placed in the back.

Referring to the figures, will now be described a preferred embodiment of the invention, that the interactive wearable video game (1) is made of a rubber fabric with a membrane of micro holes that allows for the user's vapors (transpiration) to pass through, breathable and water resistant.

The interactive wearable videogame (1) sustains the electronic components from the invention apparatus, namely the multi-touch video game portable console system (3) with its internal I/O board v2.0 Bluetooth® wireless (4) connection and its coupled micro solar battery system (17). This can be placed in the multi-touch video game portable console plastic pocket (14) or in the multi-touch video game portable console wrist neoprene pocket box (15).

The multi-touch video game portable console system (3) have an I/O board v2.0 Bluetooth® wireless (4) that allows the connection with the electrical wireless sensors, this is, the wireless glove sensor (7), the wireless airflow straw sensor (8), the wireless turn button sensor (9), the wireless accelerometer sensor (10), the wireless heart beat and skin galvanic response wrist clock sensor (11), the wireless bar sensor (12), the wireless button sensor (13), the wireless LEDS sensor—with four colored LEDS (16) and the wireless electrical brain activity Bluetooth® box transmitter (18).

The internal I/O board v2.0 Bluetooth® wireless (4) which is localized inside the multi-touch video game portable console system (3) establishes the connection with the electronic sensors wirelessly by connecting with its wireless Bluetooth® digitizers (20)—signal acquisition to maximum 100 meters distance.

The Bluetooth® digitizers (20) in a micro plastic box format are coupled/attached to the electronic sensors via an internal connection with a 3-pin column input cable extremity (2.54 mm/0.1" spaced), which is then connected to an I²C port placed inside the wireless Bluetooth® digitizers (20). The wireless Bluetooth® digitizers (20) are powered by a 9V battery, and its dimensions are 50×27×14 mm, each one weights 0.03 Kg.

The multi-touch video game portable console system (3) is prepared for anti-shock and anti-vibration with a MIL810F system (shock Mounted Hard Drive). It has a sunlight readable display and it's prepared for dust, waterproof and high and low temperatures resistance (40° C. to −50° C.).

The multi-touch video game portable console system (3) has an 800×600 display resolution with 24-bit true color and stereo sound speakers. Its dimensions are 44×74×21 mm, with a weight of 0.25 Kg—with 128 megabytes of RAM (3.2 GB/sec)/2 GB ROM SD card and GPS included.

The multi-touch video game portable console system (3) its coupled/attached to a micro solar battery system (17) that includes a powerful 1350 mAh high capacity rechargeable polymer, and that gives 2 hours of 5V power supply to the multi-touch video game portable console system (3)—it recharges from 8 to 10 hours under strong direct sun light.

The wireless glove sensor (7) when the user put the hand, where are in use, where are in rest position can be attached on the interactive wearable video game through the Velcro® system (5). The wireless glove sensor (7) it's connected to a singular Bluetooth® digitizer (20) and includes 6 pressure sensors—five on the fingertips and one on the palm. Each of these sensors responds to pressure from approx. 4 KPa (0.04 Kg/cm², 0.6 PSI) to 981 KPa (10.0 Kg/cm², 142 PSI) or a force of approx. 0.6 N (60 g, 0.13 lb) to 98 N (10 Kg, 22 lb) that's evenly applied across its active area, a 13 mm (0.51 inch) diameter disk in real-time.

The user is persuaded to use the wireless glove sensor (7) by doing pressure with these 6 sensors in a way to input triggers to the video game software tasks. The tasks goal is to establish a connection through manipulations with the surrounding environment in different contexts, other users/persons and objects. It has 95×85×41 cm and it weights 0.02 Kg.

The wireless airflow straw sensor (8) can be attached on the interactive wearable video game through the Velcro® system (5). The wireless airflow straw sensor (8) it's connected to a singular Bluetooth® digitizer (20) and measures the barometric air pressure from 15 to 115 kPa (150 to 1150 mBar) in real-time. The user is persuaded to use the wireless airflow straw sensor (8) by blowing it with its mouth, or connecting it to other physical objects that creates air in a way to input triggers to the video game software tasks—e.g. establish a connection with different physical objects like for e.g. an inflatable balloon to trigger inputs to the video game software. This sensor can be connected (to be placed in with the surrounding environment in different contexts, other users/persons and objects, besides the interactive wearable video game (1). It has 110×7.0×0.5 mm and it weights 0.01 Kg.

The wireless turn button sensor (9) can be attached on the interactive wearable video game through the Velcro® system (5). The wireless turn button sensor (9) ifs connected to a singular Bluetooth® digitizer (20) and measures a produced rotation angle from 0 to 360° (single-turn linear potentiometer) in real-time. The user is persuaded to use the wireless turn button sensor (9) by doing manipulations to control and select video-game software contents by accomplish tasks. This sensor can be connected to other physical objects, like for e.g. a mechanical lever, and can be connected (to be placed in) with the surrounding environment in different contexts, other users/persons and objects, besides the interactive wearable video game (1). It has 22×26×25 mm and it weights 0.02 Kg.

The wireless accelerometer sensor (10) it's connected to a singular Bluetooth® digitizer (20) and senses dynamic acceleration (or deceleration) and inclination (tilt, i.e. acceleration due to gravitation) in three dimensions simultaneously (x, y, z), at the same time it calculates the triple-axis earth's magnetic field intensity and acceleration allowing for identifying the user's/objects position in the spatial coordinates in real-time (e.g. rotations). This sensor can be connected to other physical objects like for e.g. action figures by calculating their real-time displacement—data results are to be visualized and controlled in the video-game software by accomplishing video game goal tasks—e.g. putting an avatar in the video-game software into movement with the user's real-time displacements. This sensor can be connected (to be placed in) with the surrounding environment in different contexts, other users/persons and objects, besides of calculating the user's displacement in the interactive wearable video game (1). It has 53×33×11 mm and it weights 0.02 Kg.

The wireless heart beat and skin galvanic response wrist clock sensor (11) is used in the wrist of the user and it's connected to a singular Bluetooth® digitizer (20) and it measures the user's heart rate (heart rate variability) and galvanic skin response (calculates the variations of user's emotional states) in real-time. The wireless heart beat and skin galvanic response wrist clock sensor (11) has two rectangular surfaces sensor pads that are made of electrical conductive material to measure skin temperature, heat flux and skin electrical conductivity. The data results are to be visualized and controlled in the video-game software by accomplish various tasks. The resulting data can be influenced by the connections between the user and the surrounding environment in different contexts, other users/persons and objects. It has 75×63×41 mm and it weights 0.04 Kg.

The wireless bar sensor (12) can be attached to the interactive wearable video game (1) and it's connected to a singular Bluetooth® digitizer (20) and it measures the contact position in a range of 100 mm (3.94 inch) in real-time linear resistive potentiometer. The user is persuaded to use the wireless bar sensor (12) by doing manipulations (sliding it) to control and select video-game software contents and to accomplish tasks. This sensor can be connected (to be placed in with the surrounding environment in different contexts, other users/persons and objects, besides the interactive wearable video game (1). It has 24×11×11 mm and it weights 0.02 Kg.

Figure 3:
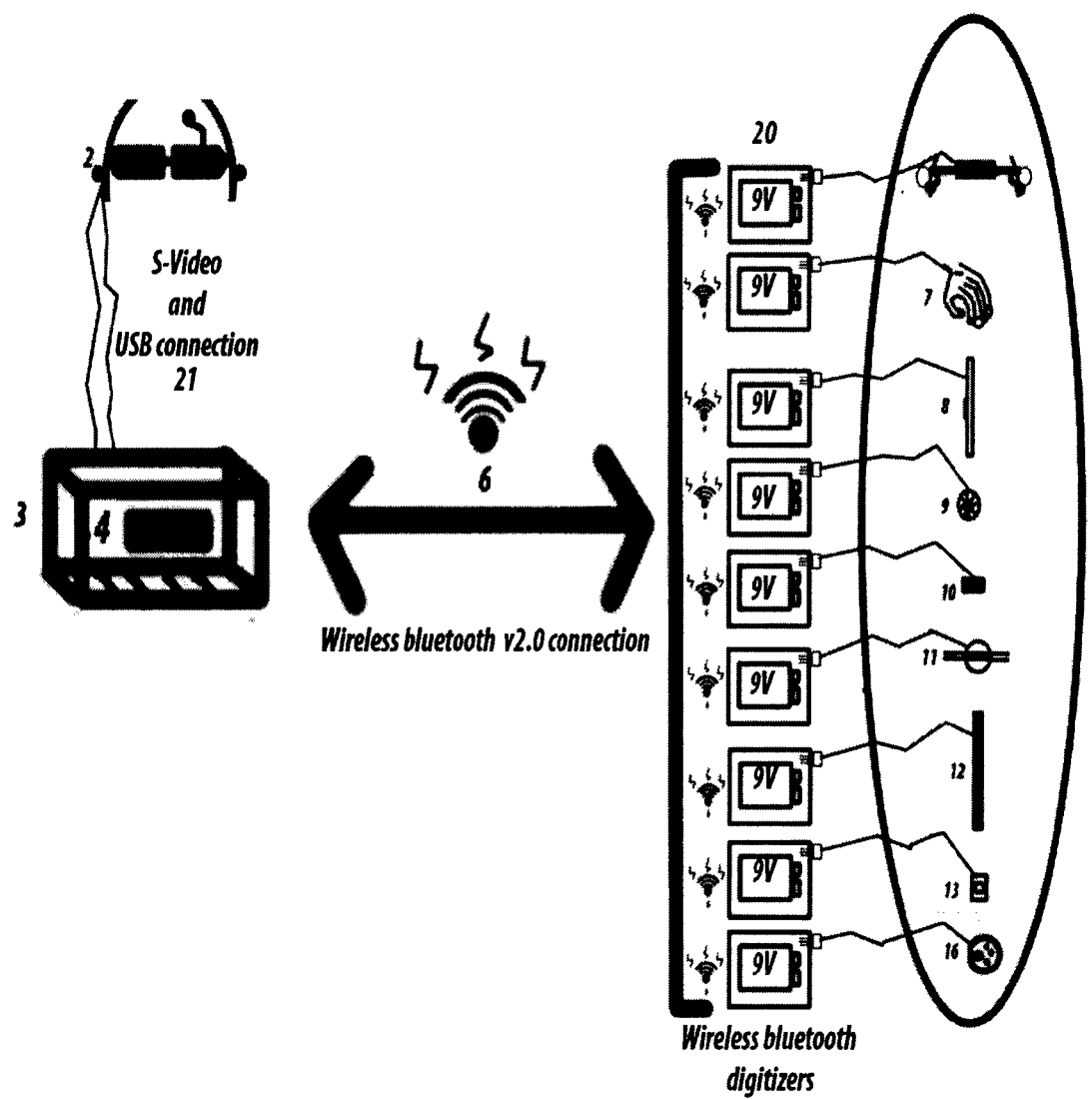
FIG. 3 is a draw of the established connections between the binocular see-through display glasses system and the multi-touch portable video game console system. This last one is wirelessly connected to the electronic sensors via wireless Bluetooth® digitizers.
Figure 4:
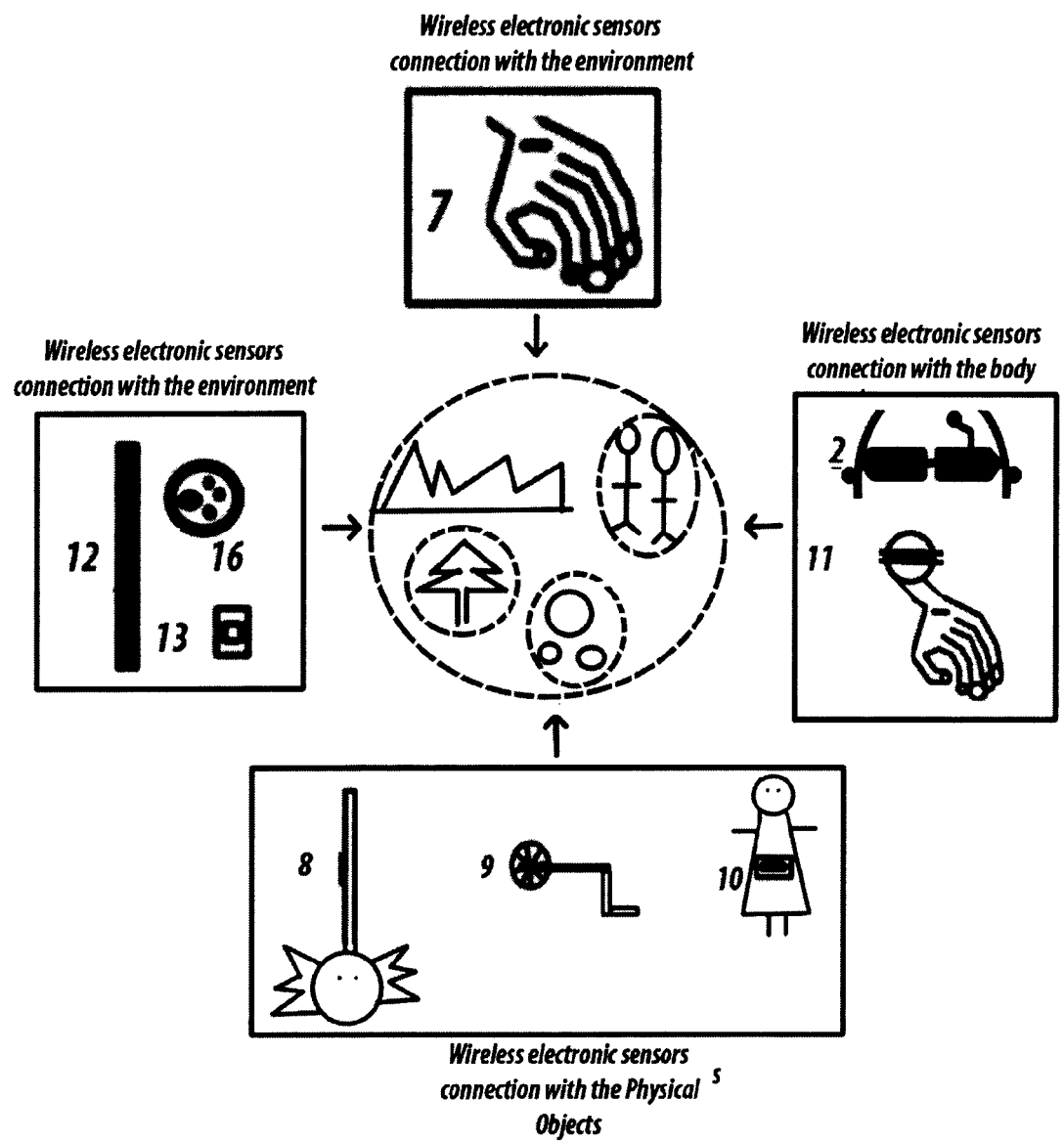
FIG. 4 is a draw of the wireless electronic sensors and their connections with the surrounding environment, other users/persons, physical objects, and the user's body.

The wireless button sensor (13) can be attached to the interactive wearable video game (1) and it's connected to a singular Bluetooth® digitizer (FIG. 3: 20) and it measures the displacement or force applied by the user in a range of 1 mm (0.04 inch) or 2.0 N (0.20 Kg, 0.45 lb) in real-time. The user is persuaded to use the wireless button sensor (13) by switch contact and select video-game software contents and to accomplish tasks. This sensor can be connected (to be placed in) with the surrounding environment in different contexts, other users/persons and objects, besides the interactive wearable video game (1). It has 30×15×5 mm and it weights 0.01 Kg.

The wireless LEDS sensor—with four colored LEDS (16) can be attached to the interactive wearable video game (1) and its connected to a singular Bluetooth® digitizer (20) and it produces light according to the proximity of the users in a multiplayer function using multiple interactive wearable video game (1). Each of the 4 lights turn "ON" when the proximity with an external user/person is increased in real-time, through a modulated infra-red light in a range of 5 cm to 200 cm (2.0 to 79 inch). This sensor can also communicate with the wireless heart beat and skin galvanic response wrist clock sensor (11) in a specific video game software function—by being activated (each of the 4 lights turns "ON" or "OFF") according with the heart rate variability from the user (high or low Hear Beat values). This sensor has a 1.5V circular battery to put the lights activated. The user is persuaded to use the wireless LEDS sensor—with four colored LEDS (16) by reaching closest with the surrounding environment and this way accomplish software video game contents and tasks. This sensor can also be connected (to be placed in) with the surrounding environment in different contexts, other users/persons and objects, besides the interactive wearable video game (1). It has 60×41×8 mm and it weights 0.02 Kg.

The binocular see-through display glasses system (2) are placed in the head of the user and works with a see-thru quantum optics technology with a 43-inch virtual screen as viewed from ten feet (~3 m) in a 23 degree diagonal field of view (16:9 aspect ratio WVGA—852×480; resolutions up to 1280×720), at 60 Hz progressive scan and 24-bit true color (16 million colors). This system works with a S-Video cable composite and component video input (21) connected to the multi-touch video game portable console system (3). The binocular see-through display glasses system (2) gives the user the possibility to control the visualized video game software image by placing it in the right eye, left eye or both— (e.g. through the use of the wireless turn button sensor (9), the wireless glove sensor (7), among the other apparatus wireless electronic sensors—since the user can change/personalize the wireless electronic sensor to perform a certain input action into the video game); In the binocular see-through display glasses system (2) is placed a single 1080p HD camera in the superior left corner that allows for 720p/1080p video capture with frame rates from 1 hz to 60 hz; and a head-tracking system with 6 degree of freedom (yaw, pitch, roll, x, y and z values) placed in the superior right corner of the of the binocular see-through display glasses system (2). The binocular see-through display glasses system (2) its powered through USB connection 2.0 send by the multi-touch video game portable console system (3). Its size its approximately 22 mm×10 mm×13 mm and weights 0.08 Kg.

The binocular see-through display glasses system (2) its placed in the user's head connected to a circular adjustable rubber strap (19)—the rubber strap adjustable (19) its connected and sustains the three wireless electrical brain activity sensor pads through the three plastic adjusters adjusted through the user's manipulations to be placed in the different parts of the head (three axis—x, y, and z values—through a micro circular spherical joint combined with the micro notch of the rubber strap). The binocular see-through display glasses system (2) also holds the wireless electrical brain activity Bluetooth® box transmitter (18) that its connected to the multi-touch video game portable console system (3) and internal I/O board v2.0 Bluetooth® wireless (4) via wireless v2.0 Bluetooth® connection (6) (9V battery powered)—transmitting digital messages in real-time from the wireless electrical brain activity sensor pads to the video game software (signal acquisition to maximum 100 meters of non-obstructed distance; 10 bits resolution).

The wireless electrical brain activity Bluetooth® box transmitter (18) sizes 81×41×24 mm and weights 0.03 Kg (including the internal 9V battery). Each one of the three wireless electrical brain activity sensor pads are connected to the wireless electrical brain activity Bluetooth® box transmitter (18) via a singular cable, which is placed inside the circular adjustable rubber strap (19)—with a 3-pin column input extremity (2.54 mm/0.1" spaced) connected to an $I^2C$ port placed inside the wireless electrical brain activity Bluetooth® box transmitter (18).

The multiplayer function can be activated in the video game software and it allows for the user to start a connection with other players by playing a collective game: in the same location sharing the physical interactive wearable video game (1) and its components and also through GPS connection/Web server—sharing the virtual scenarios/game; in different geographical locations through a Web server connection allowing for the users to share the video game performances within various tasks and this way mixing game environments that can be controlled and visualized in the interactive wearable video game (1).

Lisboa, 4 Jan. 2012

The invention claimed is:

1. An interactive wearable video game apparatus, comprising:
    a plurality of wireless electronic sensors adapted to detect a user's physical actions and physiological signals in real-time, wherein the sensors are adapted to be placed directly in the apparatus, on physical objects in a surrounding physical environment, or on other users;
    a plurality of hook-and-loop fasteners adapted to be used to attach respective sensors to desired people and objects;
    a wireless communication protocol I/O board for capturing a user's physical and physiological actions in real-time from the plurality of electronic sensors, wherein the plurality of electronic sensors are configured to communicate wirelessly with the wireless communication protocol I/O board, wherein the wireless communication protocol I/O board further provides real-time sensory stimulus for the user within an interactive video game environment; and
    a binocular see-through display glasses system, wherein the binocular see-through display glasses system is configured to allow the interactive video game environment to be visualized through either a left eye, a right eye or both eyes of the user;
    wherein the plurality of electronic sensors include a wireless airflow straw sensor adapted to measure a barometric air pressure, wherein a passage of air within the airflow straw sensor triggers an input to the interactive video game environment.

2. The interactive wearable video game apparatus of claim 1, wherein the interactive wearable video game apparatus is configured to be worn by one or more users within the interactive video game environment.

3. The interactive wearable video game apparatus of claim 1, wherein the interactive video game apparatus is configured to provide a symbiosis real time connection from both real and virtual realities, which allows the user to build a personalized game environment and develop scenarios which combine a symbolic intention from a virtual scenario, and are applied in a real physical environment when the user plays a pre-established video game narrative.

4. The interactive wearable video game apparatus of claim 1 further comprising a multi-touch video game portable console system, in which a video game runs, wherein the multi-touch video game portable console system is placed within a multi-touch video game portable console plastic pocket or within a multi-touch video game portable console wrist neoprene pocket box.

5. The interactive wearable video game apparatus of claim 1 further comprising a multi-touch video game portable console system, wherein the multi-touch video portable console system includes an internal wireless communication protocol I/O board and a system of micro solar battery which powers all the electrical components of the interactive wearable video game apparatus.

6. The interactive wearable video game apparatus of claim 1 wherein the interactive wearable video game apparatus further comprises an internal wireless communication protocol I/O board connected to the plurality of wireless electronic sensors, and one or more wireless communication protocol digitizers, which acquire the digital wireless signals.

7. The interactive wearable video game apparatus of claim 1, further comprising wireless communication protocol digitizers coupled to electronic sensors via an internal connection with a 3-pin column input cable extremity, which is then connected to a port placed inside the wireless communication protocol digitizers.

8. The interactive wearable video game apparatus of claim 1, wherein the interactive wearable video game apparatus plurality of wireless electronic sensors are detachable by a fastener system, which can be connected to all types of physical objects and produces input triggers that create a virtual output response within a video game software environment, and communicate with the interactive video game apparatus via one or more wireless communication protocol digitizers.

9. The interactive wearable video game apparatus of claim 1 further comprising an internal wireless communication protocol I/O board that captures and translates the wireless electronic sensors input signals, with high resolution, into digitally computer-encoded messages for a multi-touch video game portable console system, and the input data from the wireless electronic sensors is transmitted to a software video game program inside the multi-touch video game portable console system, which are processed by software and converted to triggers within a video game environment.

10. The interactive wearable video game apparatus of claim 1, wherein a final result of a software process is transmitted, through a wireless system, from a multi-touch video game portable console system to the binocular see-through display glasses system that is placed on a users' head through a rubber strap that adjusts the glasses, and the see-through display allows for a video game image to be visualized and integrated with the real world, allowing a mix between virtual and real environments.

11. The interactive wearable video game apparatus of claim 1, further comprising the binocular see-through display glasses system, that works with an SVideo cable and a USB connection, the cable is composite and component of the video input connected to a multi-touch video game portable console system.

12. The interactive wearable video game apparatus of claim 1, wherein the binocular see-through display glasses system is powered through a USB connection connected to a multi-touch video game portable console system.

13. The interactive wearable video game apparatus of claim 1, wherein the binocular see-through display glasses system includes a circular adjustable rubber strap, that holds three electrical brain activity sensor pads through three plastic adjusters, which are connected to a wireless communication protocol transmitter box via a cable placed inside the circular adjustable rubber strap, and the wireless communication protocol transmitter box which picks up electrical signals from sensors that measure electrical brain activity and wirelessly transmits these signals to a multi-touch video game portable console system.

14. The interactive wearable video game apparatus of claim 1, wherein the binocular see-through display glasses system and circular adjustable rubber strap are connected to a multi-touch video game portable console system and to an internal wireless communication protocol I/O board, whereby the wireless communication protocol transmitter box transmits digital messages in real time from the pads of the electrical sensors that measuring brain electrical activity to the multi-touch video game portable console system.

15. The interactive wearable video game apparatus of claim 1, wherein the plurality of electronic sensors further comprises:
a wireless glove sensor;
a wireless turn button sensor;
a wireless accelerometer sensor;
a wireless heart beat and skin galvanic response wrist clock sensor;
a wireless bar sensor;
a wireless button sensor; and
a wireless LEDS sensor—with four colored LEDS.

16. The interactive wearable video game apparatus of claim 1, further comprising detachable wireless electronic sensors used by the user to control, in the software of a video game, the intensity level of the wireless electronic sensors, the user may place the wireless detachable electronic sensors within any part of an interactive wearable video game environment through the use of a fastener system.

17. The interactive wearable video game apparatus of claim 1, further comprising detachable wireless electronic sensors that collect data for online sharing data results, game competitions and new games constructions, besides scientific data acquisition, all through a Web connection.

18. The interactive wearable video game apparatus of claim 1, wherein the detachable wireless electronic sensors collect data relating to body displacement on a spatial context, manipulations, physical objects contact and the users physical proximity; heart beat data, galvanic skin response data and brain electrical activity data.

19. The interactive wearable video game apparatus of claim 1, wherein interactive wearable video game apparatus allows the user to configure the level of intensity of the detachable wireless electronic sensors within the interactive wearable video game environment.

20. The interactive wearable video game apparatus of claim 1, further comprising a wireless electronic sensor that detects the proximity of other players in the same spatial field, which persuades the user to connect collaboratively with maximum physical proximity with the other players in the same spatial field.

21. The interactive wearable video game apparatus of claim 1, further comprising persuading the user to increase their physical activity levels and learning skills—provides motor and physiological data combined results based on an accurate real-time measurement of the user's body displacement on a spatial context, manipulations, physical objects contact, heart beat data, skin galvanic response data (emotional states), and brain electric activity data and the physical proximity of other players—and from which the interactive wearable video game apparatus will cause a software response which motivates the user to undertake a course of action within a narrative better suited to their physical, physiological and psychological needs.

* * * * *